United States Patent [19]

Hongo et al.

[11] Patent Number: 4,775,499
[45] Date of Patent: Oct. 4, 1988

[54] GAS-LIQUID CONTACTING APPARATUS

[75] Inventors: Kenjiro Hongo, Tokyo; Shiro Saito, Kawaguchi, both of Japan

[73] Assignee: Sankyo Kogyo Co., Ltd., Tokyo, Japan

[21] Appl. No.: 57,170

[22] Filed: Jun. 2, 1987

[30] Foreign Application Priority Data

Jun. 7, 1986 [JP] Japan .......................... 61-131096[U]
Feb. 18, 1987 [JP] Japan ................................. 62-21323

[51] Int. Cl.$^4$ ............................................... B01F 3/04
[52] U.S. Cl. ....................................... 261/106; 55/240
[58] Field of Search .................. 261/106; 55/240, 241

[56] References Cited

U.S. PATENT DOCUMENTS

| | | | |
|---|---|---|---|
| 782,190 | 2/1905 | Clough | 261/106 |
| 907,633 | 12/1908 | Narowetz | 55/240 |
| 2,042,289 | 5/1936 | Baldwin | 261/106 |
| 2,112,041 | 3/1938 | Miller | 261/106 |
| 2,129,428 | 9/1938 | Johnson | 209/393 |
| 3,031,173 | 4/1962 | Kohl et al. | 261/106 |
| 3,266,224 | 8/1966 | Ferretti | 55/240 |
| 3,360,911 | 1/1968 | Sweeney | 209/393 |
| 3,625,491 | 12/1971 | Yokoi et al. | 261/106 |
| 3,656,280 | 4/1972 | Perry | 55/240 |
| 4,250,038 | 2/1981 | Dryden | 209/393 |

FOREIGN PATENT DOCUMENTS

740111 11/1955 United Kingdom .................. 55/241

*Primary Examiner*—Tim Miles
*Attorney, Agent, or Firm*—Lackenbach Siegel Marzullo & Aronson

[57] ABSTRACT

A gas-liquid contacting apparatus according to the present invention comprises a gas channel, a blowing device, a screen, a liquid feeding device and a pump. The screen is supplied continuously with liquid by means of the pump and the liquid dosing device, forming liquid film in intervals where gas passes through all the time. Gas fed out of the blowing device breaks through said liquid film or screen. In this moment, the gas-liquid contact is completed as the specific components contained in the gas are chemically decomposed and removed, being diffused in liquid. The liquid film is broken and re-formed repeatedly while the gas flows.

4 Claims, 4 Drawing Sheets

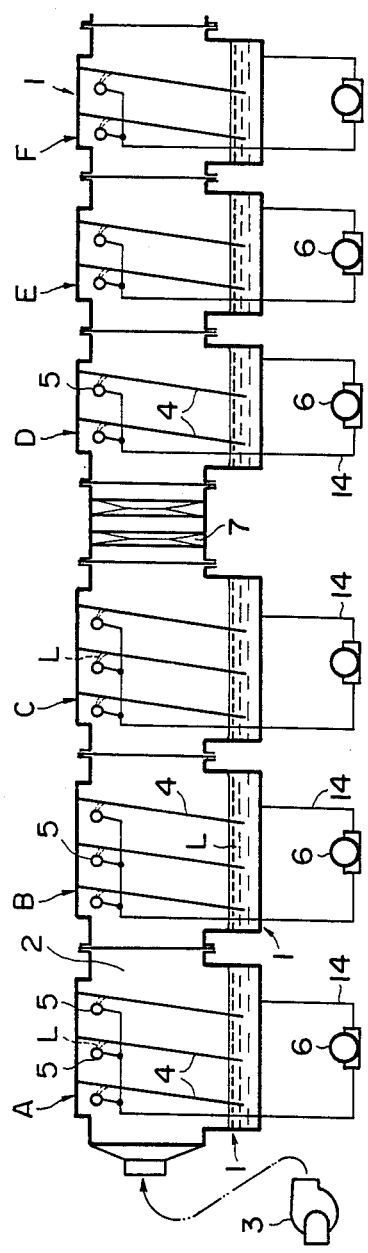
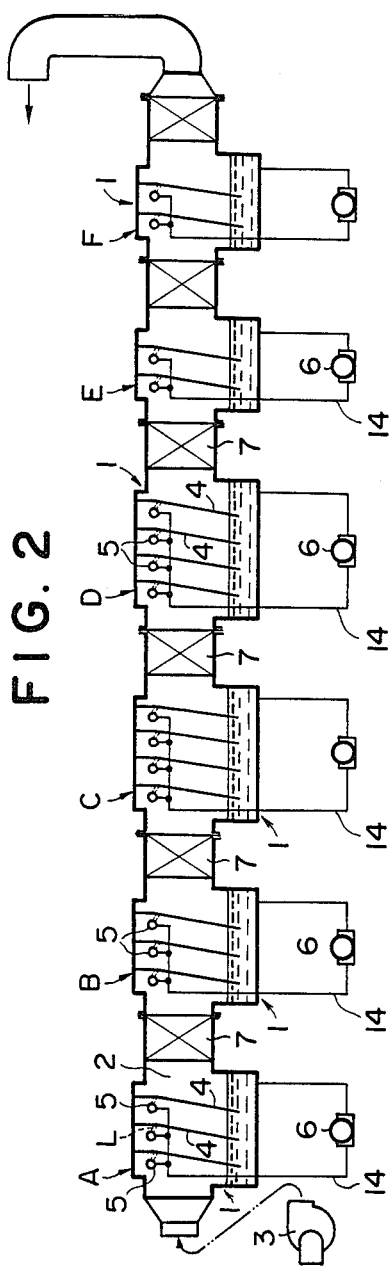

GAS-LIQUID CONTACTING APPARATUS

BACKGROUND OF THE INVENTION (1) Field of the Invention

This invention relates to a gas-liquid contacting apparatus. Said apparatus is utilized for deodorizing gas.

(2) Description of the Prior Art

Conventionally, as system deodorizing offensive odor gas or harmful gas, the washing-absorbing system is most popularly employed. In order to increase the absorption efficiency for specific components in a gas, it is important to contact gas with liquid effectively as much as possible and to facilitate the chemical decomposition of these specific components and diffusion thereof into liquid. There are many types of equipment performing the washing-absorbing system. however, popular deodorizing equipment is classified into the packed tower system (FIG. 8) and spray system (FIG. 10). Referring to FIG. 8 and FIG. 10, same numerals in the drawings shall indicate identical or corresponding parts.

A washing-absorbing equipment of the packed tower system 21 is an equipment to contact gas with liquid by feeding a liquid 23 to the surface of a packing 22 having large surface area and feeding a gas 24 in the counter current (reversely directed to the dropping direction, in principle). Conditions of the packing are large specific surface area and high void ratio, low resistance to gas flow, and low occurence of overflow or drift. Further conditions are high acid resistance, low specific gravity and high mechanical strength. Packings popularly used are of two types as illustrated in FIG. 9.

A spray tower 31 is used for humidifying, cooling and dust-collecting of gas while there can be used as a deodorizing equipment. The spray tower system easily causes drift, providing a bad influence to the deodorizing effect. In order to avoid such bad influence, the multi-stage spray system as illustrated in the drawing is used in many cases. A system illustrated in FIG. 10 is of two-stage type while three-stage type or five-stage type is actually applied for.

Since such a vertical type equipment is unable to use various types of chemicals by itself, three equipments are required to use three types of chemicals, for instance.

On the packed tower system, operation becomes impossible owing to the splash phenomenon of liquid if the flow rate of gas is too high while too small quantity of feeding liquid causes drift and too much quantity causes overflow. Chemicals containing solids or sediments can cause clogging where is required much maintenance to remove clogging and replace packings.

SUMMARY OF THE INVENTION

A gas-liquid contacting apparatus according to the present invention being equipped with a gas channel, a blowing device mounted in relation to said gas channel and wires parallelly arranged on a same plane comprises a screen installed in said gas channel so as to clog said gas channel and make said wires horizontal, a liquid dosing device leading to said gas channel for dosing liquid to said screen, and a pump installed on a pipe connecting said gas channel and said liquid dosing device for returning said liquid dropped from said screen so that liquid film is formed on the entire screen when liquid is poured continuously onto the screen.

Angle of the screen is an angle to form film entirely on the screen when liquid is poured continuously onto the screen, which must be decided according to the effects of shape of wire, intervals of wires, flowing speed of gas and quantity of liquid.

By means of pouring liquid from the liquid dosing device onto the screen, liquid film having a certain thickness is formed according to the molecular force. By feeding a gas to the gas channel by the blowing device, the formed liquid film can be put in contact with gas continuously and effectively. The film is broken by the passing of gas, however, the film is formed again immediately by the liquid, which is supplied continuously. On the screen, such breaking and forming of film are repeated. The liquid dropped from the screen is returned to the liquid dosing device by the pump and can be utilized to contact with gas again.

Increase of the passing speed of gas can be covered by pouring the liquid in a quantity corresponding thereto. Also, by changing angle of the screen, the relation between passing speed of gas and quantity of liquid can be adjusted.

Opportunity of contacting gas with liquid is available by multiplying screens. In such a case, the contacting opportunity of gas and liquid is increased so that one screen is made by two sheets of wires, and wire intervals of each sheet are not on a same plane when the screen is mounted on the gas channel, and several units of screen with liquid dosing device are combined in each unit of the gas-liquid contacting apparatus.

To contact with more than one type of liquid, as the sectional drive system is easily introduced, drive and stop of pumps, and recombination and partial stop of operation procedure of unit are possible by pouring different liquids to each unit and installing a demister to outlet of each unit.

Consequently, the object of the present invention is to provide a gas-liquid contacting apparatus enabling to give the continuous and effective contact of gas and liquid.

Another object of the present invention is to provide a gas-liquid contacting apparatus enabling to obtain a superior contacting effect of gas and liquid by pouring a liquid in the quantity corresponding to the increased passing speed of gas.

Another and further object of the present invention is also to be utilized, when more than one type of contacting liquid is necessary, by utilizing a gas-liquid contacting apparatus excluding a blowing device, feeding gas through the apparatus by a blowing device, and by applying the sectional drive system to each unit.

Other and further object of the present invention is to reduce screen clogging by installing a wire screen turned lateral on a gas channel, forming always liquid film among wires by means of dropping liquid continuously and naturally onto the screen and by minimizing the pressure drop without decreasing the contacting effect according to the gas-liquid contact by repeated breakage and recondition of this liquid by gas flow, not causing the splash phenomenon or the overflow and drift of liquid.

Another and further object of the present invention is to provide an effective gas-liquid contact by selecting suitably wire intervals of screen and shapes of wires and rod according to the quantity of liquid.

Another and further object of the present invention is to make a more effective gas-liquid contact by a construction so that two sheets of wires make one screen where wire intervals of each sheet are not on a same plane when the screen is mounted on the gas channel.

Another and further object of the present invention is to adjust optionally the relation of the passing speed of gas and quantity of liquid by changing the set angle of screen.

Another and further object of the present invention is to provide a liquid dosing device to drop liquid evenly onto the screen.

Another and further object of the present invention is to provide a liquid dosing device enabling to a more even drop of liquid by bending the drop end of nozzle of liquid feeding part to more than 90 degrees to the brim of flowing outlet so that the position of liquid leaving the liquid feeding part is nearly on a vertical plane.

Other objects of the present invention will become apparent upon a reading of the following description of an embodiment accompanying the drawings.

BRIEF DESCRIPTION OF THE DRAWINGS

FIG. 1 is a schematic front view of a gas-liquid contacting apparatus of the present invention;

FIG. 2 is a schematic front view of other embodiment of the present invention;

DETAILED DESCRIPTION OF THE INVENTION

Figure 3:
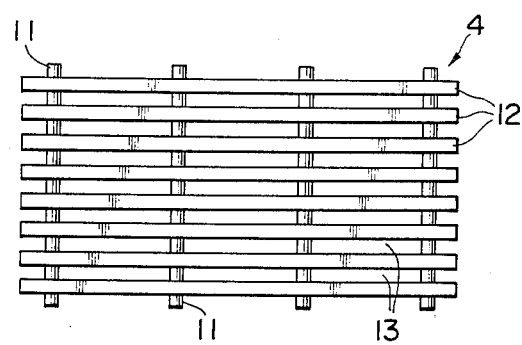
FIG. 3 is a front view of a screen.

Referring to the drawings, 1 is a gas-liquid contacting apparatus comprising a gas channel 2, a blowing device 3 mounted in relation to the channel 2, a screen 4 arranged in the channel 2, a liquid dosing device 5 projected in the channel for pouring liquid onto the screen 4 and a pump 6 for feeding back liquid dropped from the screen 4 to the liquid dosing device.

FIG. 1 shows a combination of units A, B and C, and another combination of D, E and F, both of which are connected by means of a demister 7. FIG. 2 is a case where each unit, A through F, is equipped with the demister 7.

Figure 4:
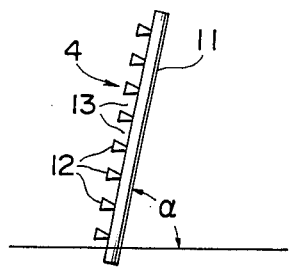
FIG. 4 is a side view of the screen.
Figure 5:
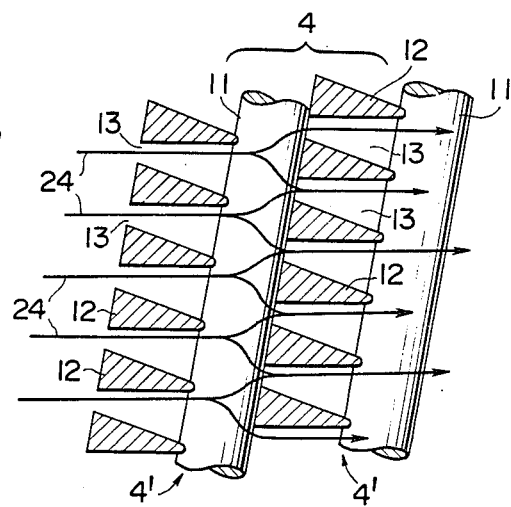
FIG. 5 is a side view of other embodiment of the screen.
Figure 6:
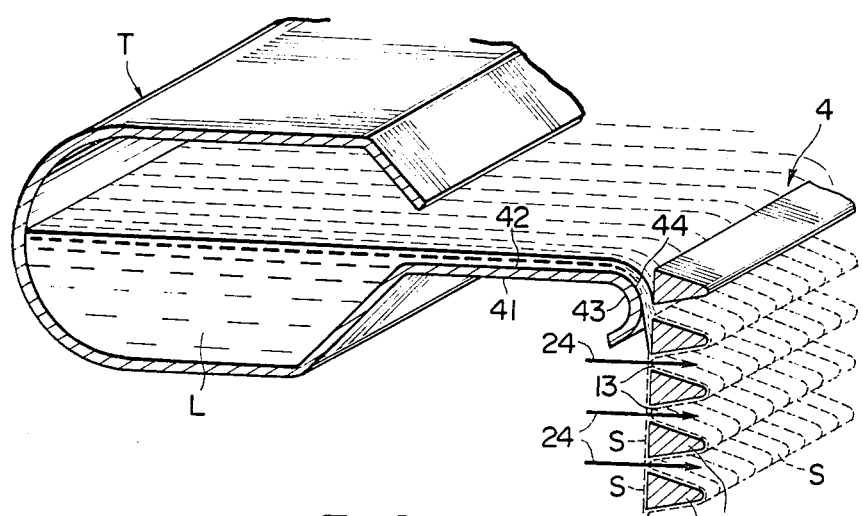
FIG. 6 is a partial cutaway perspective view of an example of a liquid vessel.
Figure 7:
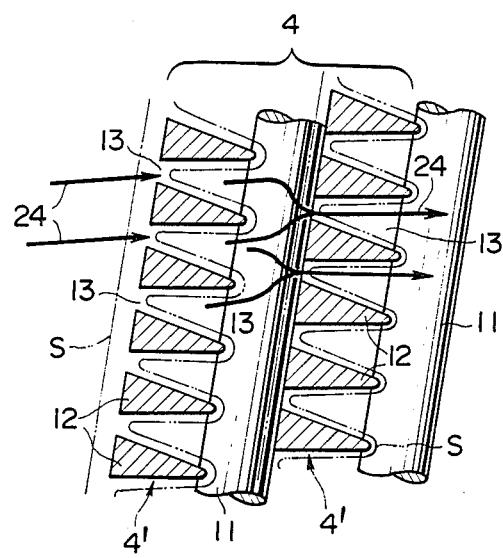
FIG. 7 is an illustration showing the forming condition of liquid film on the screen as shown in FIG. 5.
Figure 10:
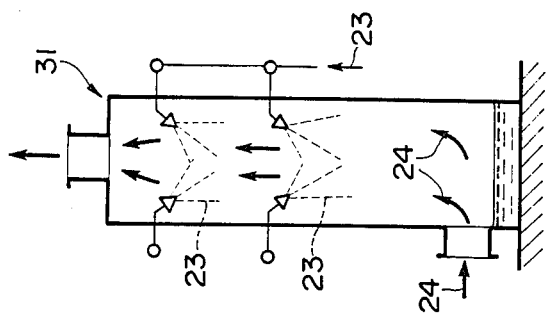
FIG. 10 is a schematic front view of a device of the spray tower system.
Figure 9:
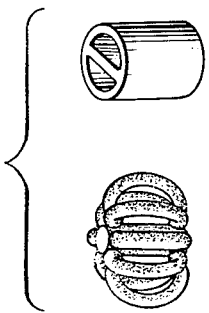
FIG. 9 is a perspective view of two types of packing.
Figure 8:
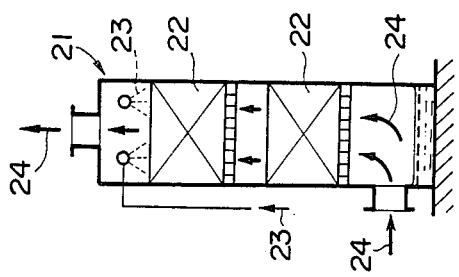
FIG. 8 is a schematic front view of a device of the packed tower system.

The screen 4 is a flat screen comprising a rod 11 and wires 12 parallelly arranged thereon (FIG. 3 and FIG. 4). FIG. 5 shows the screen 4 composed of a pair of sheets 4', in which both sheets 4' are arranged so that intervals 13 among the wires 12 are conditioned so as not to be on a same plane by installing the screen 4 in the gas channel 2. Gas 24 passes through the interval 13 on this side and flows by turning its direction touching the wires at the back where a more effective gas-liquid contact is available.

This screen 4 is installed to intersect the gas channel 2 and let the wires 12 be horizontal. Angle of this screen α is usually 70-85 degrees to the horizontal line while the angle is agreeable to form film entirely on the screen when liquid is poured continuously onto the screen, which is affected by the shape of wire, wire interval 13 and speed of gas. The pump 6 is installed in relation to a channel 14 connecting the gas channel 2 with the liquid dosing device 5.

According to liquid dosing by the liquid dosing device 5, liquid is poured onto an upper part of the screen 4 as shown in FIG. 1 and FIG. 2, dropped gradually and spread entirely on the screen.

As shown in FIG. 1 and FIG. 2, the apparatus consists of six units, providing an effective deodorizing work by pouring liquid P into the units A, B and C, liquid Q into the units D and E, and liquid R into the unit F. By employing the sectional drive system, necessary units are only operated according to the concentration of offensive odor, which contributes to power-saving.

Further, a combination use of the liquid dosing device 5 and a liquid vessel T gives a more effective operation. 41 is a brim of outlet for liquid L and a surface 42 is made flat for feeding out liquid in an even layer. 43 is a liquid feeding part, surface of which 44 is curved to the underneath of the brim 41, with a certain curvature. This radius of curvature is properly determined according to the viscosity of flow rate of liquid.

The liquid L flown out of the liquid vessel T flows in a thin even layer on the surface 42, turns its direction along the curved surface 44 of the feeding part 43, and drops almost vertically in an even quantity.

Receiving the dropped liquid by the screen 4, liquid film S can be formed on the entire surface of all wires.

If the top end of the liquid feeding part 43 is curved in more than 90 degrees to the brim 41, both surfaces of the layer become nearly parallel when liquid leaves this feeding part 43 where flow rate can be kept more evenly on the entire section.

What is claimed is:

1. A gas-liquid contacting apparatus comprising
a gas channel,
a blowing device installed in relation to said gas channel,
a screen including a plurality of widely spaced rods and at least two parallel plane sheets fixed to said rods, said screen being installed in said gas channel to intercept said gas channel, said sheets comprising a plurality of parallel horizontal wires having V-shaped sections and connected at intervals to said rods,
a liquid dosing device positioned in said gas channel to pour liquid onto said screen,
a pump installed on a pipe connecting the bottom of said gas channel and said liquid dosing device to feed back liquid dropped out of said screen to said liquid dosing device,
said wires of one said sheet being positioned on a different horizontal plane than the wires of an adjoining sheet so that the gas does not flow straight through the respective wire intervals, and
said liquid dosing device including a liquid vessel for holding the feed back liquid, said liquid dosing device having a flat horizontal outlet brim extending from said liquid vessel and being curved at a certain radial angle of curvature so that liquid film is formed on the entire surface of said screen when the liquid is poured from said outlet brim continuously onto the screen.

2. A gas-liquid contacting apparatus as claimed in claim 1, wherein said angle of curvature is more than 90 degrees to said outlet brim, whereby the liquid leaves said liquid dosing device on a substantially vertical plane.

3. A gas-liquid contacting apparatus as claimed in claim 1, said wires being fixed to said rods by their bottoms, said wire intervals being formed between a lower or an upper top edge of adjoining wires stretched to the opposite side of the bottom, where gas breaks through a liquid film formed by a flowing liquid.

4. A gas-liquid contacting apparatus as claimed in claim 3, and said screen being positioned at a certain inclination to the horizontal plane.

* * * * *